US011305866B2

(12) United States Patent
Peterson et al.

(10) Patent No.: US 11,305,866 B2
(45) Date of Patent: Apr. 19, 2022

(54) SPOILER ACTUATOR LOFT ALLEVIATION MECHANISMS

(71) Applicant: The Boeing Company, Chicago, IL (US)

(72) Inventors: Miranda Marie Peterson, Kirkland, WA (US); Kevin Raylin Tsai, Seattle, WA (US)

(73) Assignee: The Boeing Company, Chicago, IL (US)

( * ) Notice: Subject to any disclaimer, the term of this patent is extended or adjusted under 35 U.S.C. 154(b) by 116 days.

(21) Appl. No.: 16/910,268

(22) Filed: Jun. 24, 2020

(65) Prior Publication Data

US 2021/0403140 A1    Dec. 30, 2021

(51) Int. Cl.
*B64C 9/18* (2006.01)
*B64C 9/02* (2006.01)
*B64C 7/00* (2006.01)

(52) U.S. Cl.
CPC .................. *B64C 9/18* (2013.01); *B64C 7/00* (2013.01); *B64C 9/02* (2013.01)

(58) Field of Classification Search
CPC .... B64C 9/02; B64C 9/18; B64C 3/58; B64C 7/00
See application file for complete search history.

(56) References Cited

U.S. PATENT DOCUMENTS

| 4,717,097 A * | 1/1988 | Sepstrup | B64C 9/323 |
| | | | 244/217 |
| 7,051,982 B1 * | 5/2006 | Johnson | B64C 7/00 |
| | | | 244/215 |
| 2019/0009888 A1 * | 1/2019 | Martens | F15B 15/26 |

FOREIGN PATENT DOCUMENTS

GB                430941 A *   6/1935   ............. B64C 9/323

* cited by examiner

*Primary Examiner* — Richard R. Green
*Assistant Examiner* — William L Gmoser
(74) *Attorney, Agent, or Firm* — Quinn IP Law

(57) ABSTRACT

A wing spoiler actuator mechanism includes an upper spoiler having a free end and a hinge end pivotally coupled to a wing structure at a first fixed axis, a door pivotally coupled to the wing structure at a second axis, and an actuator pivotally mounted to the wing structure between the upper spoiler and the door, the actuator having an extendable first end coupled to the upper spoiler and an opposite second end. Extension of the first end of the actuator rotates the upper spoiler to a deployed position and rotates the actuator such that the second end of the actuator induces downward rotation of the door from a closed position to an open position and the second end of the actuator extends below the wing structure during spoiler deployment.

20 Claims, 12 Drawing Sheets

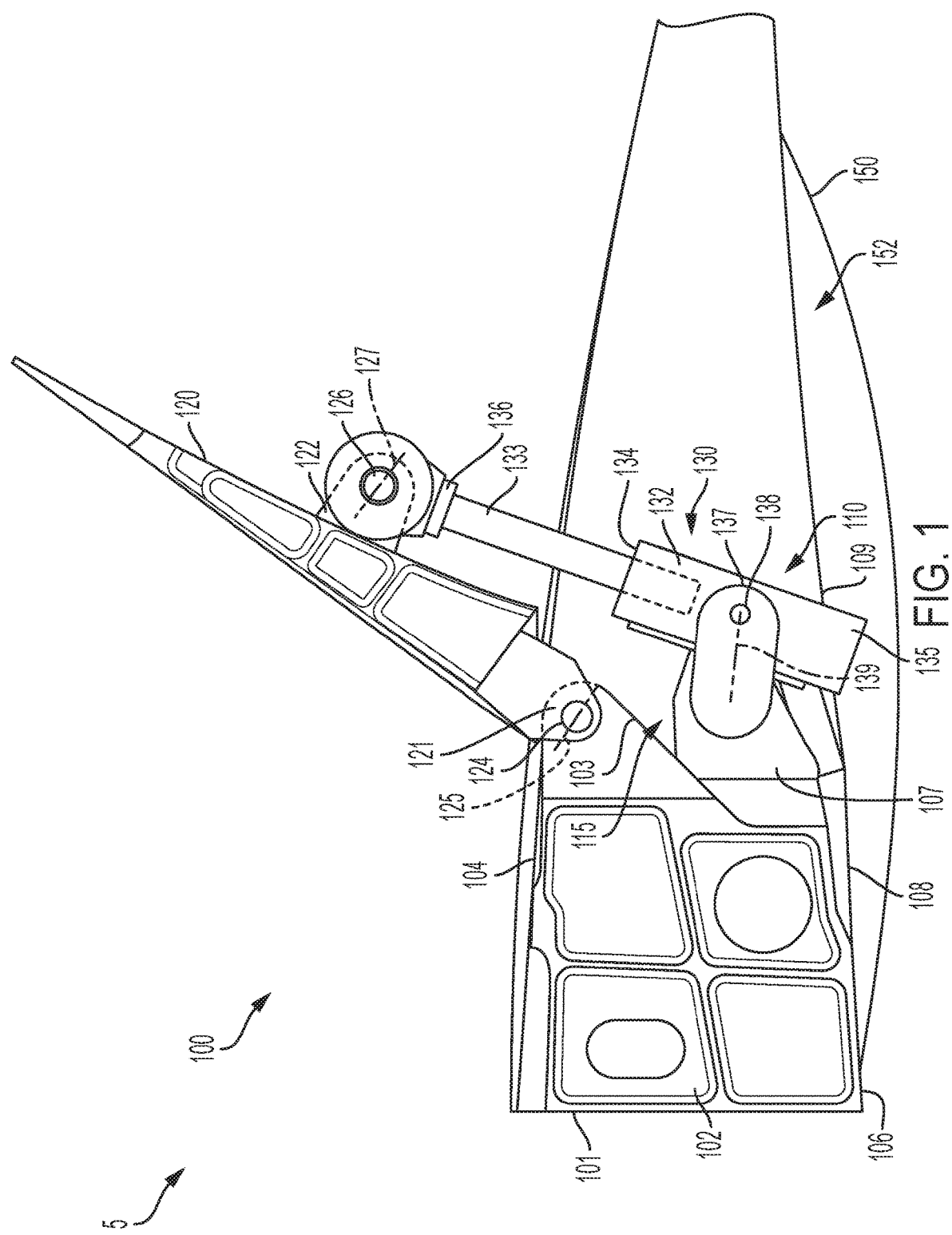

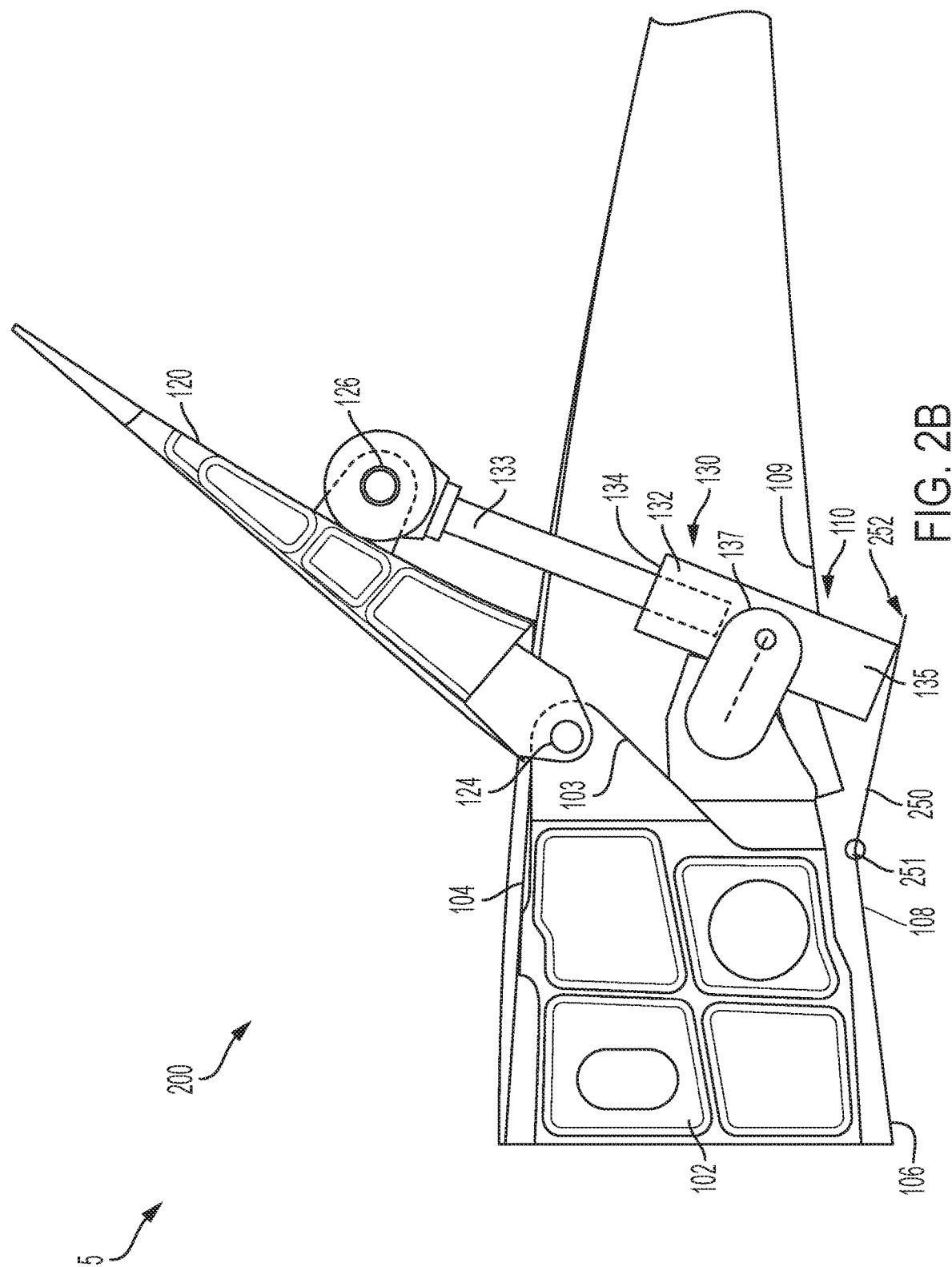

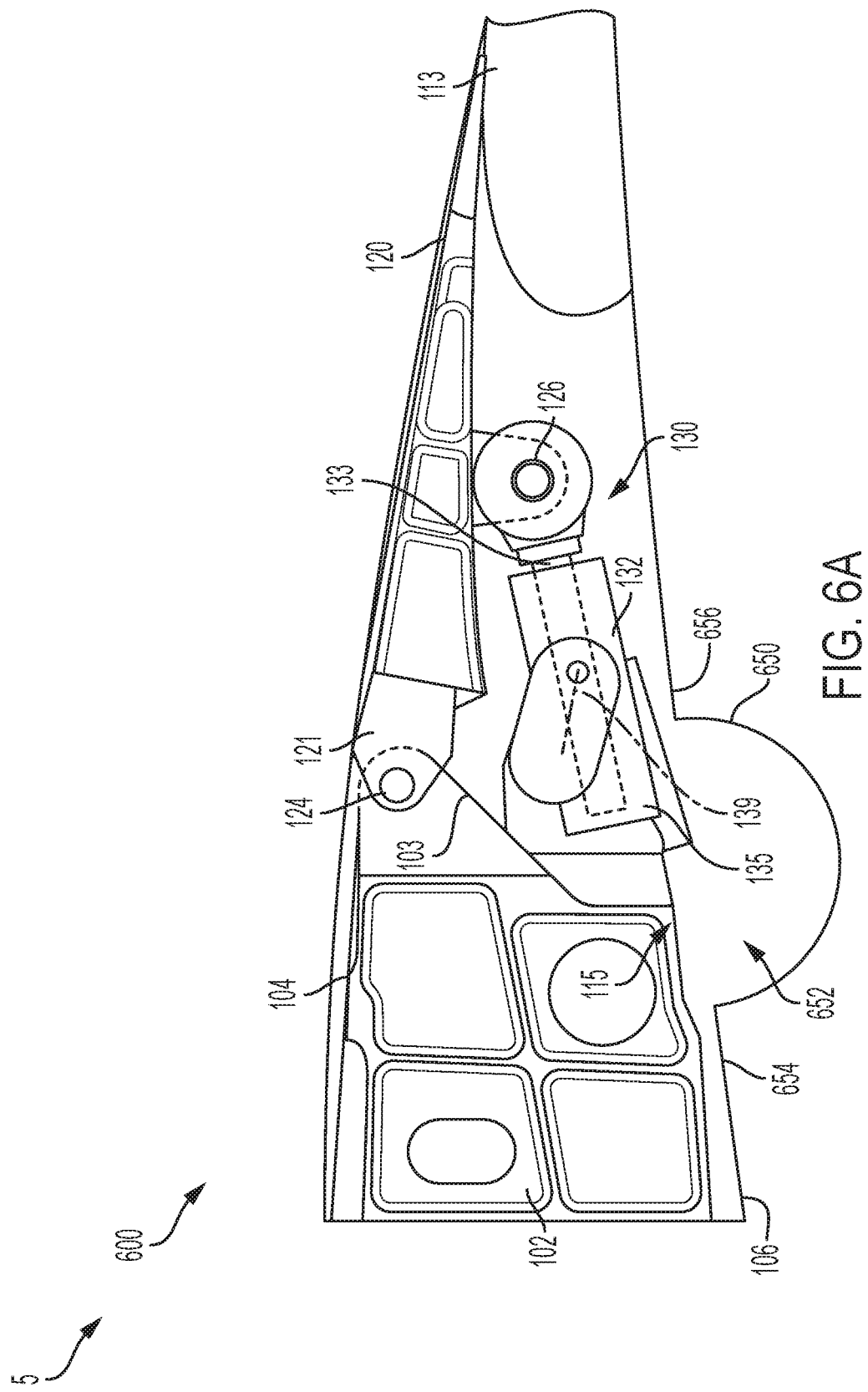

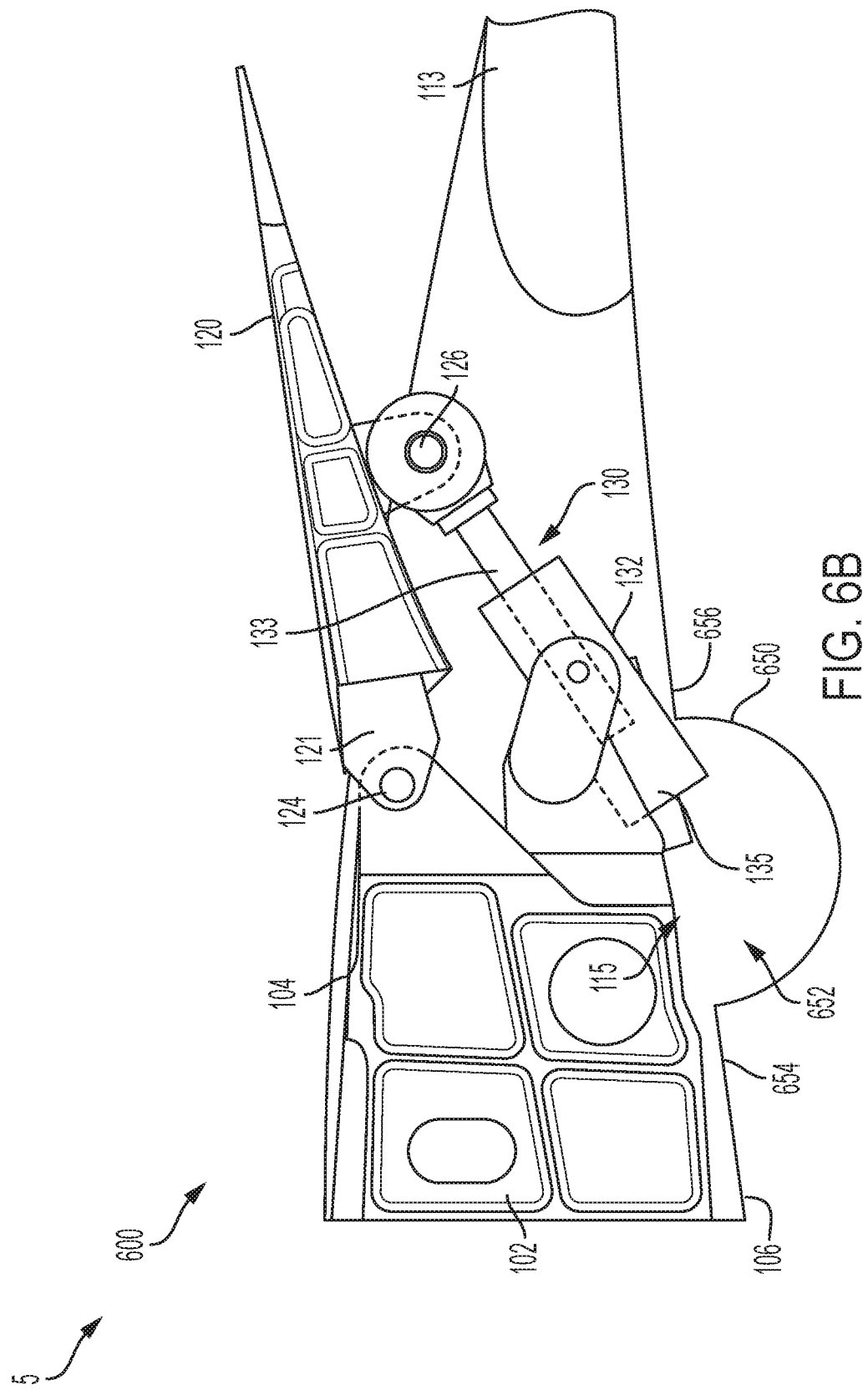

SPOILER ACTUATOR LOFT ALLEVIATION MECHANISMS

INTRODUCTION

The present disclosure relates to the field of aircraft wing systems and mechanisms for spoiler actuator loft alleviation.

Aircraft wings in flight have a laminar airflow creating a pressure profile over the top and bottom of the wing. A spoiler (sometimes called a lift spoiler or lift dumper) is a device intended to intentionally reduce the lift component of the wing in a controlled way. Most often, spoilers are plates on the top surface of a wing that can be extended upward into the airflow to spoil it. By so doing, the spoiler creates a controlled stall over the portion of the wing behind it, greatly reducing the lilt of that wing section. The spoiler is extended upward via an actuation mechanism, such as a rotatable actuator. However, as the actuator actuates to extend the spoiler upward, the actuator body rotates downward below the bottom of the wing, creating drag.

SUMMARY

Embodiments according to the present disclosure provide a number of advantages. For example, embodiments according to the present disclosure enable thin wing or airfoil loft profiles that have reduced drag when a spoiler is extended to an upward deployed position. In various embodiments, the actuator body engages a door or other mechanism to move to an open position when the actuator rotates downward. Engagement of the door or other mechanism allows space for the actuator body to rotate below the lower surface of the wing or wing-like structure when the spoiler is extended upward. The door or other mechanism returns to a closed position when the actuator body rotates back within the cove space of the wing, thus reducing drag.

In one aspect of the present disclosure, a wing spoiler actuator mechanism includes an upper spoiler having a free end and a hinge end pivotally coupled to a wing structure at a first fixed axis, a door pivotally coupled to the wing structure at a second axis, and an actuator pivotally mounted to the wing structure between the upper spoiler and the door, the actuator having an extendable first end and a second end opposite the first end, the extendable first end coupled to the upper spoiler. Extension of the first end of the actuator rotates the upper spoiler to a deployed position and rotates the actuator such that the second end of the actuator induces downward rotation of the door from a closed position to an open position and the second end of the actuator extends below the wing structure during spoiler deployment.

In some aspects, the second axis is fixed and the second end of the actuator engages the door to rotate the door from the closed position to the open position.

In some aspects, the wing spoiler actuator mechanism further includes a retention member coupled to the door and the wing structure such that the door is predisposed to the closed position.

In some aspects, the wing spoiler actuator mechanism further includes a coupler linkage disposed between and pivotally coupled to the door and the second end of the actuator, wherein extension of the first end of the actuator rotates the actuator and causes rotation of the coupler linkage inducing downward rotation of the door from the closed position to the open position.

In some aspects, the coupler linkage includes a bracket extending from the door, a coupler pivotally connected to the bracket and the second end of the actuator, a first pivot pin pivotally connecting the coupler to the bracket, a second pivot pin pivotally connecting the coupler to the actuator, and a third pivot pin pivotally connecting the door to the wing structure. Rotation of the actuator causes rotation of the coupler about the first pivot pin inducing downward rotation of the door from the closed position to the open position.

In some aspects, the coupler linkage includes a bracket extending from the door, a first link member, a second link member, a third link member, and a fourth link member, the first link member pivotally connected to the bracket and to the second link member; the second link member pivotally connected to the first link member and to the wing structure at a third fixed axis, the third link member pivotally coupled to the wing structure at the third fixed axis and to the fourth link member, and the fourth link member pivotally coupled to the third link member and the actuator. Rotation of the actuator causes rotation of the second and third link members about the third fixed axis inducing downward rotation of the door from the closed position to the open position.

In some aspects, the third fixed axis is forward of the first and second axes.

In some aspects, the door includes a first panel, a second panel, and a third panel, the first panel is pivotally coupled to the wing structure at the second axis, the second panel is pivotally coupled to the first panel and to the third panel, and the third panel is translationally coupled to the wing structure such that the second end of the actuator engages the door to rotate the first panel in a first direction and the second panel in a second direction opposite the first direction to move the door from the closed position to the open position.

In some aspects, each of the second and third panels translates relative to the wing structure as the door moves between the closed position and the open position.

In another aspect of the present disclosure, an aircraft wing includes an upper wing structure and a lower wing structure joined by a spar, a rib coupled to the spar, an upper spoiler having a first end and a hinge end pivotally coupled to the rib at a first fixed axis, a door coupled to the lower wing structure and movable between a closed position and an open position, and an actuator pivotally mounted within the aircraft wing between the upper spoiler and the door, the actuator having an extendable first end coupled to the upper spoiler and an opposite second end. Extension of the first end of the actuator rotates the upper spoiler to a deployed position and rotates the actuator such that the second end of the actuator induces downward movement of the door from the closed position to the open position in which the second end of the actuator extends below the lower wing structure during spoiler deployment.

In some aspects, the door is pivotally coupled to the lower wing structure at a second axis and the second end of the actuator engages the door to rotate the door from the closed position to the open position.

In some aspects, the aircraft wing further includes a coupler linkage disposed between and pivotally coupled to the door and the second end of the actuator, wherein extension of the first end of the actuator rotates the actuator and causes rotation of the coupler linkage inducing downward rotation of the door from the closed position to the open position.

In some aspects, the coupler linkage includes a bracket extending from the door, a coupler pivotally connected to the bracket and the second end of the actuator, a first pivot pin pivotally connecting the coupler to the bracket, a second pivot pin pivotally connecting the coupler to the actuator, and a third pivot pin pivotally connecting the door to the wing structure. Rotation of the actuator causes rotation of the coupler about the first pivot pin inducing downward rotation of the door from the closed position to the open position.

In some aspects, the coupler linkage includes a bracket extending from the door, a first link member, a second link member, a third link member, and a fourth link member, the first link member pivotally connected to the bracket and to the second link member; the second link member pivotally connected to the first link member and to the spar at a third fixed axis, the third link member pivotally coupled to the spar at the third fixed axis and to the fourth link member, and the fourth link member pivotally coupled to the third link member and the actuator. Rotation of the actuator causes rotation of the second and third link members about the third fixed axis inducing downward rotation of the door from the closed position to the open position.

In some aspects, the third fixed axis is forward of the first fixed axis.

In some aspects, the door includes a first panel and a second panel, the first panel is pivotally coupled to the lower wing structure and the second panel is pivotally coupled to the first panel and to the lower wing structure such that the second end of the actuator engages the door to rotate the first panel in a first direction and the second panel in a second direction opposite the first direction to move the door from the closed position to the open position.

In some aspects, each of the first and second panels translates relative to the lower wing structure as the door moves between the closed position and the open position.

In another aspect of the present disclosure, a wing spoiler actuator mechanism includes an upper spoiler having a free end and a hinge end pivotally coupled to a wing structure at a first fixed axis, a fairing movably coupled to the wing structure, and an actuator pivotally mounted to the wing structure between the upper spoiler and the door, the actuator having an extendable first end coupled to the upper spoiler and an opposite second end. Extension of the first end of the actuator rotates the upper spoiler to a deployed position and rotates the actuator such that the second end of the actuator induces translation of the fairing from a first position to a second position and the second end of the actuator extends outside the wing structure during spoiler deployment.

In some aspects, the fairing defines a fairing space configured to receive the second end of the actuator and the first position of the fairing is forward of the second position.

In some aspects, the fairing includes a first panel and a second panel, the first panel is pivotally coupled to the wing structure and the second panel is pivotally coupled to the first panel and to the wing structure such that the second end of the actuator engages the fairing to rotate the first panel in a first direction and the second panel in a second direction opposite the first direction to move the door from the closed position to the open position.

BRIEF DESCRIPTION OF THE DRAWINGS

The present disclosure will be described in conjunction with the following figures, wherein like numerals denote like elements.

FIG. 1 is a schematic cross-sectional representation of a spoiler actuator loft alleviation mechanism, according to an embodiment.

FIG. 2B is a schematic cross-sectional representation of a spoiler actuator loft alleviation mechanism in a second position, according to another embodiment.

FIG. 6A is a schematic cross-sectional representation of a spoiler actuator loft alleviation mechanism in a first position, according to another embodiment.

FIG. 6B is a schematic cross-sectional representation of a spoiler actuator loft alleviation mechanism in a second position, according to another embodiment.

Figure 2A:
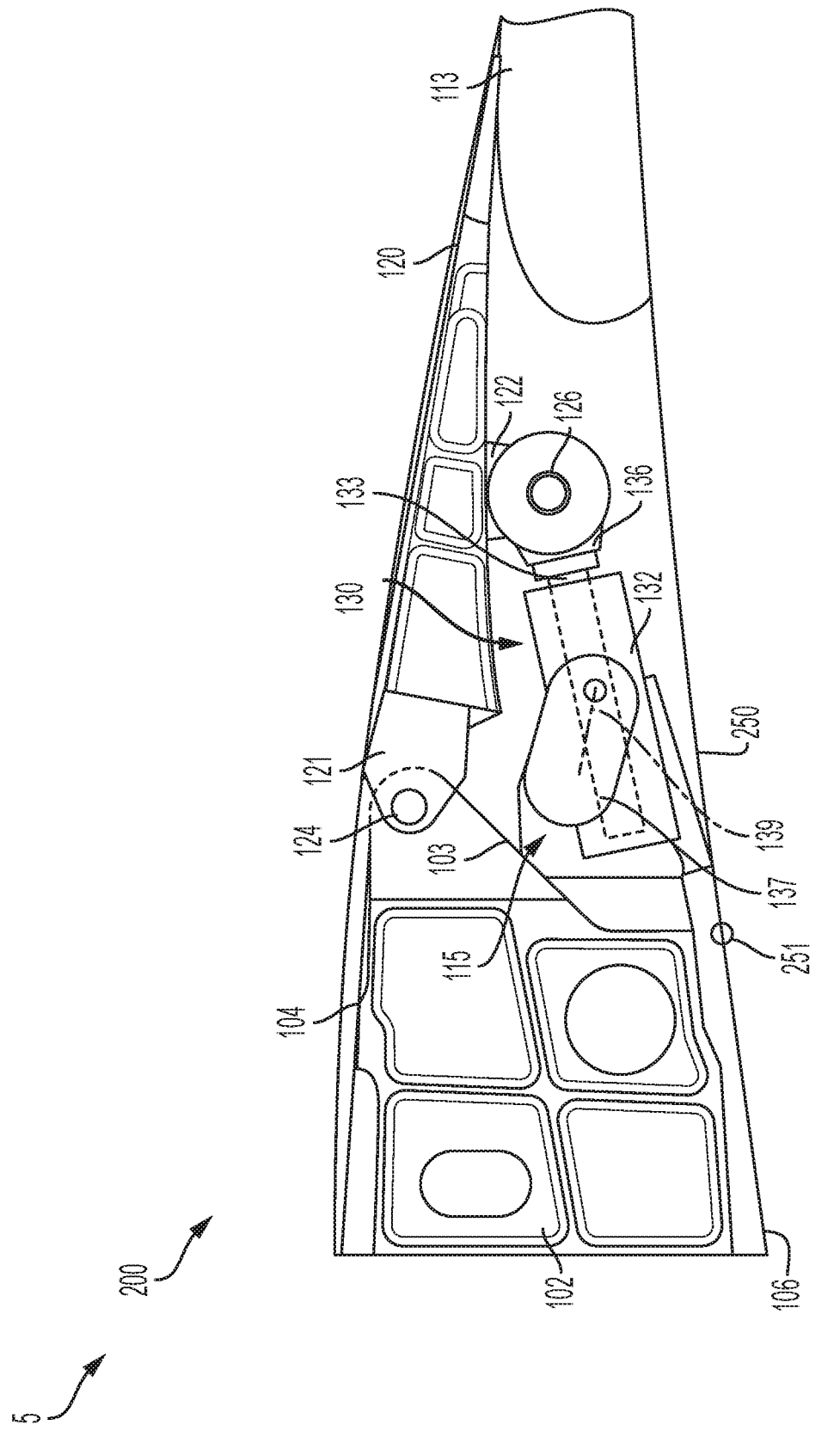
FIG. 2A is a schematic cross-sectional representation of a spoiler actuator loft alleviation mechanism in a first position, according to another embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "fore," "aft," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

The embodiments discussed herein feature a mechanism configured to allow a portion of an actuator body to extend below a lower surface of a wing or wing-like structure when the actuator rotates to extend a spoiler to an upward extended position. In various embodiments, the mechanism is aligned with the lower surface of the wing when in a closed position to reduce drag and extends below the lower surface of the wing when in an open position to accommodate the movement of the actuator. In various embodiments, the mechanism includes a surface, such as a translational fairing, that defines a space into which the portion of the actuator body extends when actuating the spoiler to the upward extended position.

Referring to the drawings, where like reference numbers refer to like components, an embodiment of a wing spoiler actuator mechanism 100 for an aircraft wing 5 is shown in FIG. 1. A wing structure includes a spar 101 extending spanwise through the wing 5 and a rib 102 terminating in an aft edge 103. The wing structure further includes an upper surface 104 and a lower surface 106. A spoiler 120 is pivotally attached to the rib 102 at a forward hinge end 121 with a first axle 124 for rotation about a first axis 125. An actuator 130 is pivotally coupled to the spoiler 120 such that actuation of the actuator 130 induces rotation of both the spoiler 120 and the actuator 130, as discussed herein. The actuator 130 includes a body 132 and an arm 133 extending from a first end 134. The arm 133 is pivotally attached to a coupling member 122 of the spoiler 120 at a coupling end 136 with a second axle 126 for rotation about a second axis 127.

The actuator 130 is pivotally attached to the rib 102 via a mount 107. In various embodiments, the actuator 130 includes a manifold 137 pivotally coupled to the mount 107 with a third axle 138 for rotation about a third axis 139. In various embodiments, the mount 107 is a trunnion mount. A second end 135 of the actuator 130 opposite the first end 134 rotates downward during actuation of the actuator 130 in which the arm 133 extends from the first end 134 and the coupling end 136 acts on the coupling member 122 of the spoiler 120.

The lower surface 106 of the wing structure also includes a first edge 108 and a second edge 109 defining an opening 110. The position of the actuator 130 underneath the spoiler 120 allows for more cove space 115 within the wing 5 to accommodate additional wing structures and systems. In a stowed position, the actuator 130 fits within the cove space 115 of the wing 5. However, when the actuator 130 rotates about the third axis 139, the second end 135 of the actuator 130 can move substantially, resulting in a portion of the actuator 130 protruding several inches below the lower surface 106 of the wing 5. To accommodate the movement of the actuator 130, a fairing 150 is attached to the lower surface 106. The fairing 150 defines a fairing space 152 within which the actuator 130 can rotate to protect the actuator 130 from the environment. The fairing 150 is a permanent feature of the wing and affects aerodynamic performance of the wing while increasing structural complexity.

FIGS. 2A and 2B illustrate another embodiment of a wing spoiler actuator mechanism 200 for an aircraft wing 5. The wing structure includes the rib 102 terminating in the aft edge 103. The spoiler 120 is pivotally attached to the rib 102 at the forward hinge end 121 with the first axle 124 defining a first fixed axis. A wing flap 113 is pivotally attached to the wing structure such that the wing flap 113 both rotates and extends/retracts to alter the airflow over the surface of the wing 5 to affect lift and drag depending on whether the aircraft is on approach, landing, in flight, etc. The actuator 130 is pivotally coupled to the spoiler 120 such that actuation of the actuator 130 induces rotation of both the spoiler 120 and the actuator 130. The arm 133 of the actuator 130 is pivotally attached to the coupling member 122 of the spoiler 120 with the second axle 126.

The actuator 130 is pivotally attached to the rib 102 via the mount 107, which, in some embodiments, is a trunnion mount. In various embodiments, the actuator 130 includes a manifold 137 pivotally coupled to the mount 107. The second end 135 of the actuator 130 opposite the first end 134 rotates downward during actuation of the actuator 130 in which the arm 133 extends from the first end 134 and the coupling end 136 acts on the coupling member 122 of the spoiler 120.

With reference to FIG. 2B, the first edge 108 and the second edge 109 of the lower surface 106 of the wing structure define the opening 110. In a stowed position, as shown in FIG. 2A, the actuator 130 fits within the cove space 115 of the wing. However, when the actuator 130 rotates about the third axis 139, the second end 135 of the actuator 130 moves to an actuated position, shown in FIG. 2B, resulting in a portion of the actuator 130 protruding several inches below the lower surface 106 of the wing.

To accommodate the movement of the actuator 130, a door 250 is pivotally coupled to the lower surface 106 at the first edge 108 with an axle 251 that permits rotation about a fixed axis defined by the axle 251. Extension of the arm 133 from the first end 134 of the actuator 130 rotates the spoiler 120 to a deployed position, as shown in FIG. 2B and rotates the actuator 130 such that the second end 135 of the actuator 130 induces downward rotation of the door 250 from a closed position, as shown in FIG. 2A, to an open position, as shown in FIG. 2B. In various embodiments, including the illustrated embodiment, the second end 135 of the actuator 130 directly engages with an interior surface 252 of the door 250 to rotate the door 250 from the closed position to the open position.

The second end 135 of the actuator 130 extends outside the wing structure during deployment of the spoiler 120. Airflow across the wing travels from left or fore to right or aft, as shown in FIGS. 2A and 2B and is directed by the door 250 away from the second end 135 of the actuator 130. The increased drag on the wing 5 when the door 250 is in the open position is limited in duration, as compared to a permanent fairing. When the spoiler 120 is not deployed, as shown in FIG. 2A, the door 250 extends substantially in line with the lower surface 106 of the wing structure to minimize aerodynamic effects of drag. In various embodiments, the axle 251 includes a retention member, such as a spring, that is coupled to the door 250 and to the wing structure such that the door 250 is predisposed to the closed position.

Figure 3A:
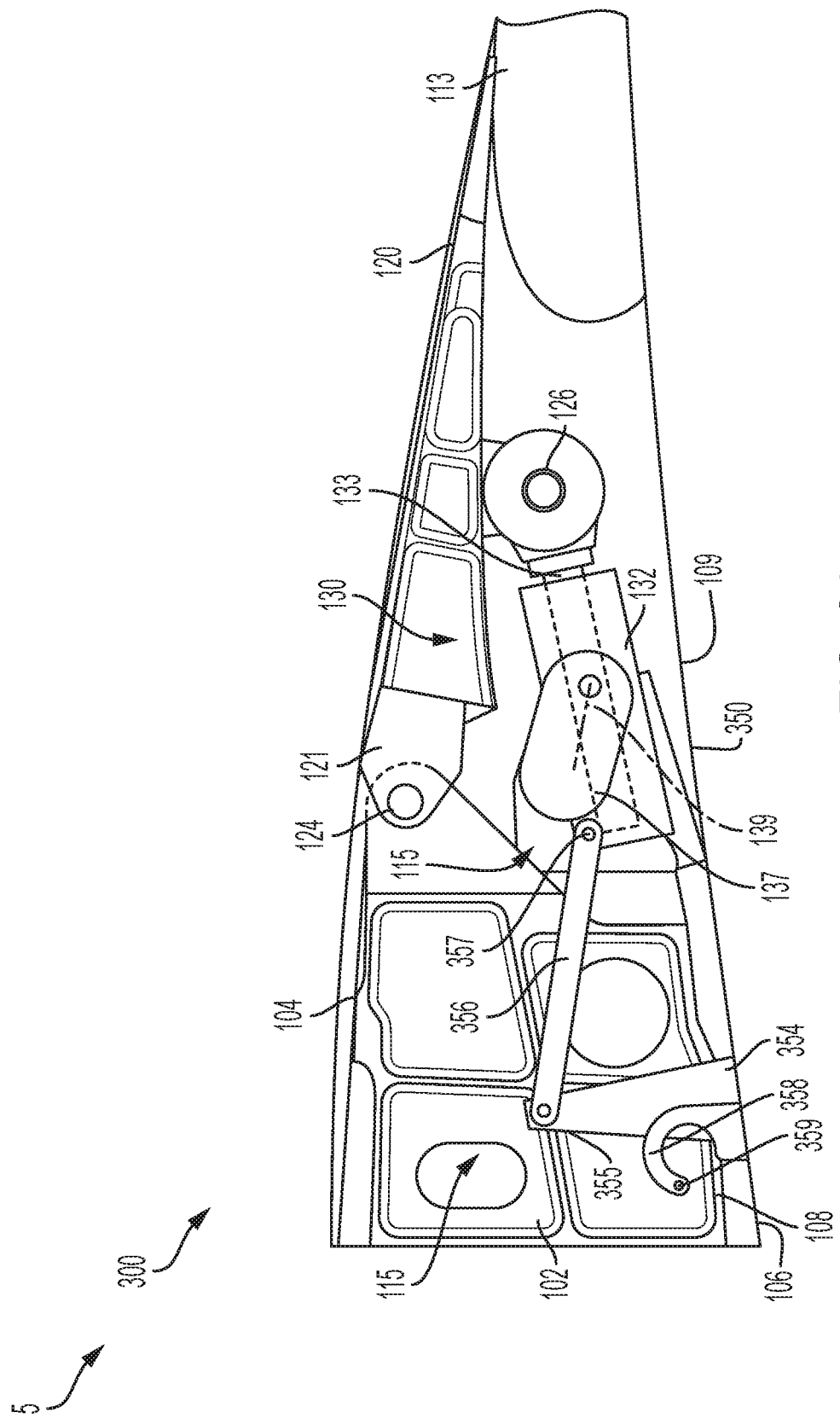
FIG. 3A is a schematic cross-sectional representation of a spoiler actuator loft alleviation mechanism in a first position, according to another embodiment.
Figure 3B:
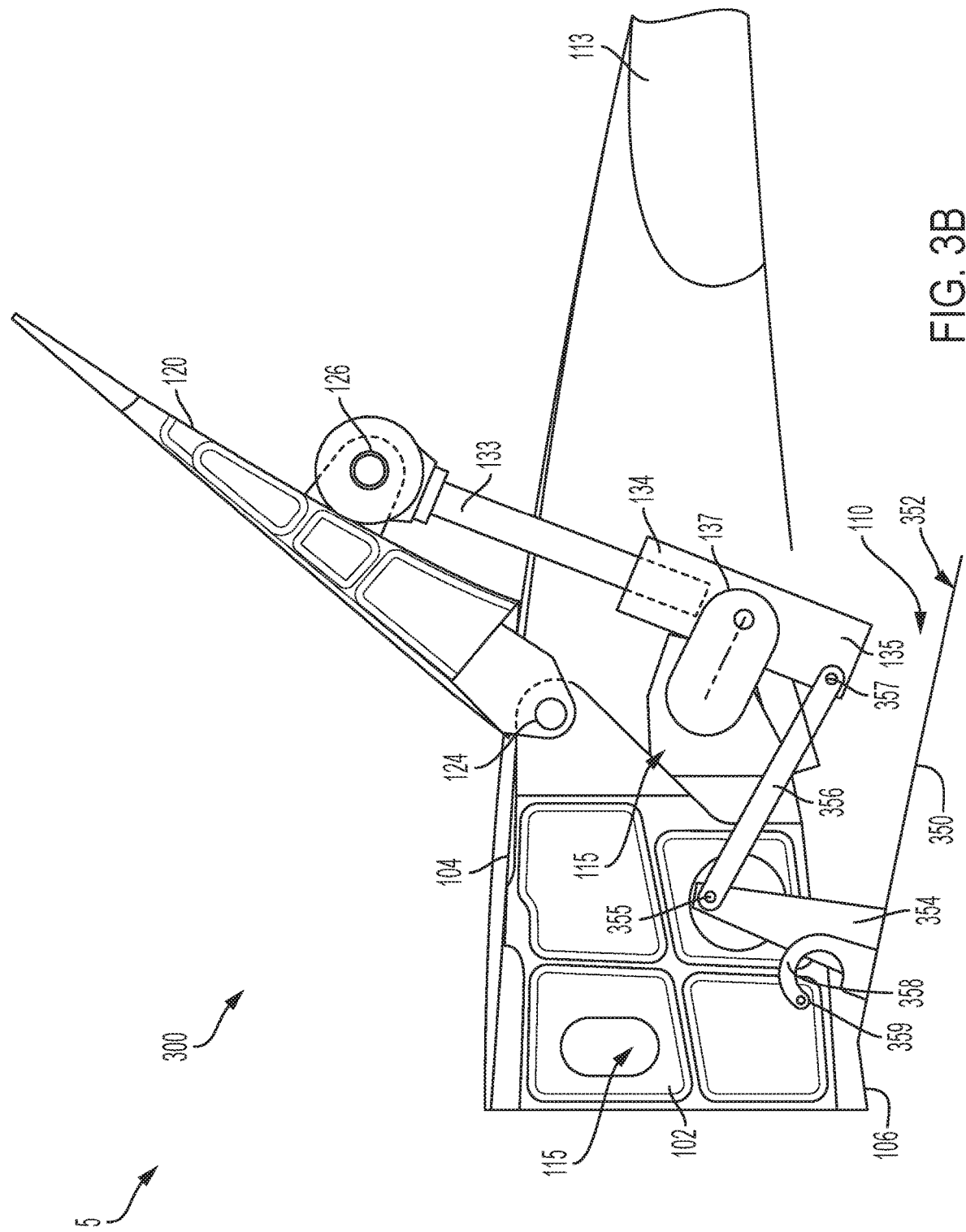
FIG. 3B is a schematic cross-sectional representation of a spoiler actuator loft alleviation mechanism in a second position, according to another embodiment.
Figure 3C:
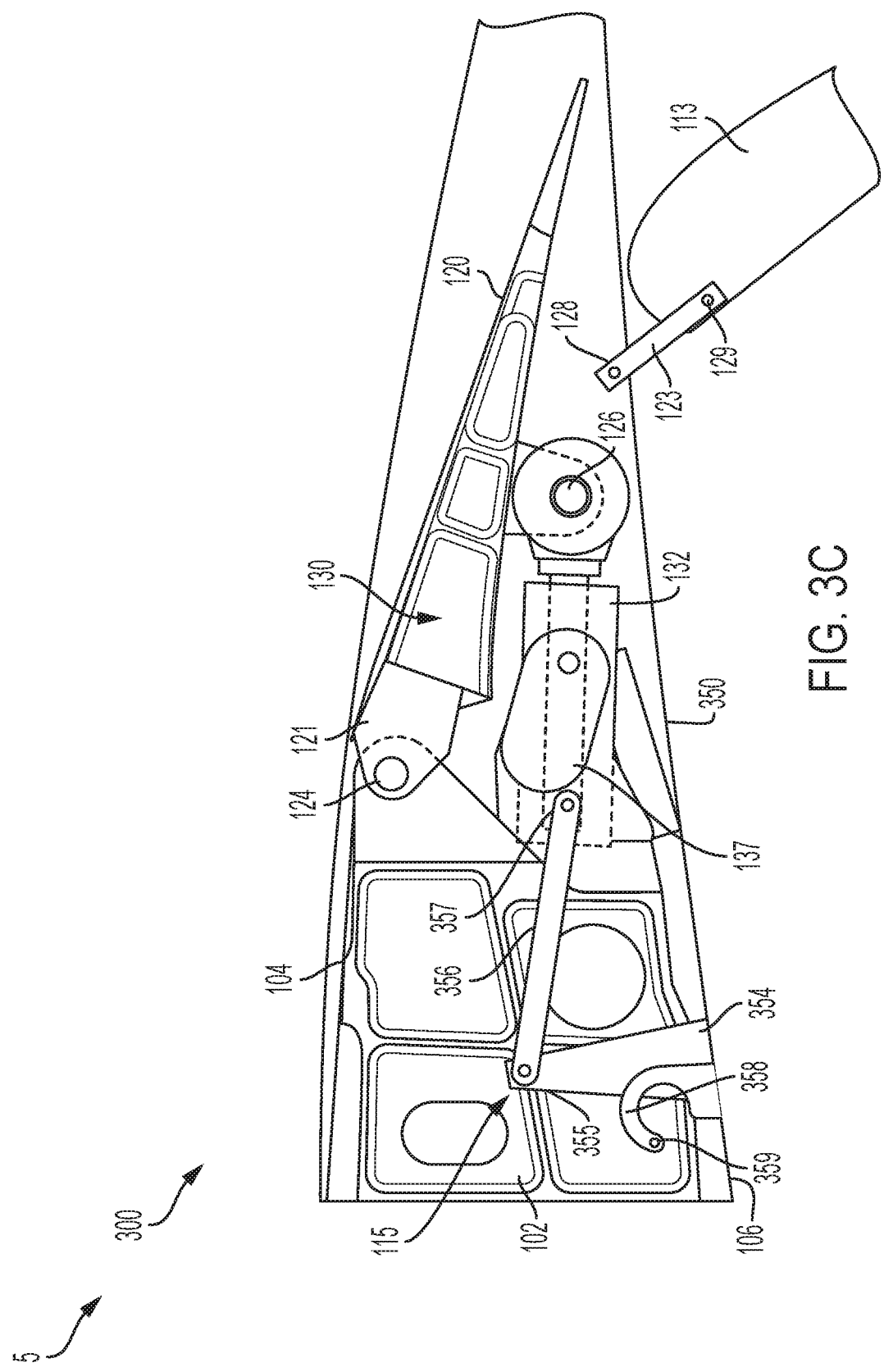
FIG. 3C is a schematic cross-sectional representation of a spoiler actuator loft alleviation mechanism in a third position, according to another embodiment.

Another embodiment of a wing spoiler actuator mechanism 300 for an aircraft wing 5 is illustrated in FIGS. 3A, 3B, and 3C. As discussed with reference to FIGS. 1, 2A, and 2B, the wing structure includes the rib 102 terminating in the aft edge 103. The spoiler 120 is pivotally attached to the rib 102 at the forward hinge end 121 with the first axle 124. A wing flap 113 is pivotally and translationally coupled to the wing structure with a member 123. The member 123 is pivotally attached to the wing structure, such as the rib 102, at a first flap hinge pin 128 and to the flap 113 at a second flap hinge pin 129. The actuator 130 is pivotally coupled to the spoiler 120 such that actuation of the actuator 130 induces rotation of both the spoiler 120 and the actuator 130. The arm 133 of the actuator 130 is pivotally attached to the coupling member 122 of the spoiler 120 with the second axle 126.

In a stowed position, as shown in FIG. 3A, the actuator 130 and the components of the wing spoiler actuator mechanism 300 fit within the cove space 115 of the wing. However, when the actuator 130 rotates about the third axis 139, the second end 135 of the actuator 130 moves to an actuated position, shown in FIG. 3B, resulting in a portion of the actuator 130 protruding several inches below the lower surface 106 of the wing.

To accommodate the movement of the actuator 130, a door 350 is pivotally coupled to the lower surface 106 and rotates downward via a transfer of force from the actuator 130 through a linkage. A coupler linkage 356 is pivotally coupled with the door 350 via a bracket 354 at a first pivot or hinge pin 355 and with the second end 135 of the actuator 130 at a second pivot or hinge pin 357. The bracket 354 is fixedly connected to, or formed integrally with, the door 350. A hinge member 358 includes a third pivot or hinge pin 359 to pivotally connect the door 350 with the wing structure such as the rib 102.

Extension of the arm 133 from the first end 134 of the actuator 130 rotates the spoiler 120 to a deployed position and rotates the actuator 130 such that the second end 135 of the actuator 130 induces, via the coupler linkage 356, downward rotation of the door 350 from a closed position, as shown in FIG. 3A, to an open position, as shown in FIG. 3B. In the illustrated embodiment, the second end 135 of the actuator 130 does not directly engage with an interior surface 352 of the door 350. The coupler linkage 356 connecting the bracket 354 and the actuator 130 transfers the force to rotate the door 350 between the closed position and the open position without direct contact or scrubbing between the actuator 130 and the door 350.

Similar to the embodiment discussed with reference to FIGS. 2A and 2B, airflow across the wing travels from left or fore to right or aft and is directed by the door 350 away from the second end 135 of the actuator 130. The increased drag on the wing when the door 350 is in the open position is limited in duration, as compared to a permanent fairing. When the spoiler 120 is not deployed, as shown in FIG. 3A, the door 350 extends substantially in line with the lower surface 106 of the wing structure to minimize aerodynamic effects of drag.

In each of the disclosed embodiments, and as illustrated in FIG. 3C, rotating the spoiler 120 inward and/or down enables the wing 5 to have increased camber initiating further forward than in other wing designs. For embodiments that include a mechanism to predispose the door to a closed position, such as the embodiment shown in FIGS. 2A and 2B, the door 250 will remain in the closed position as the actuator 130 rotates the spoiler 120 to a downward position (spoiler droop) and the lower loft in front of the wing flap 113 will be continuous and ideal. However, for embodiments including a linkage mechanism, such as the embodiment shown in FIGS. 3A, 3B, and 3C, it is possible that as the spoiler 120 rotates downward, the door 350 may open inwardly and create a gap that creates turbulent air flow. To reduce the possibility of creating the turbulent flow, the wing spoiler actuator mechanism 300 is designed such that the door 350 either dwells and creates minimal motion upon spoiler droop or the coupler linkage 356 rotates over center, as shown in FIG. 3C, to return the door 350 to a flush position with the lower surface 106 upon spoiler droop.

Figure 4A:
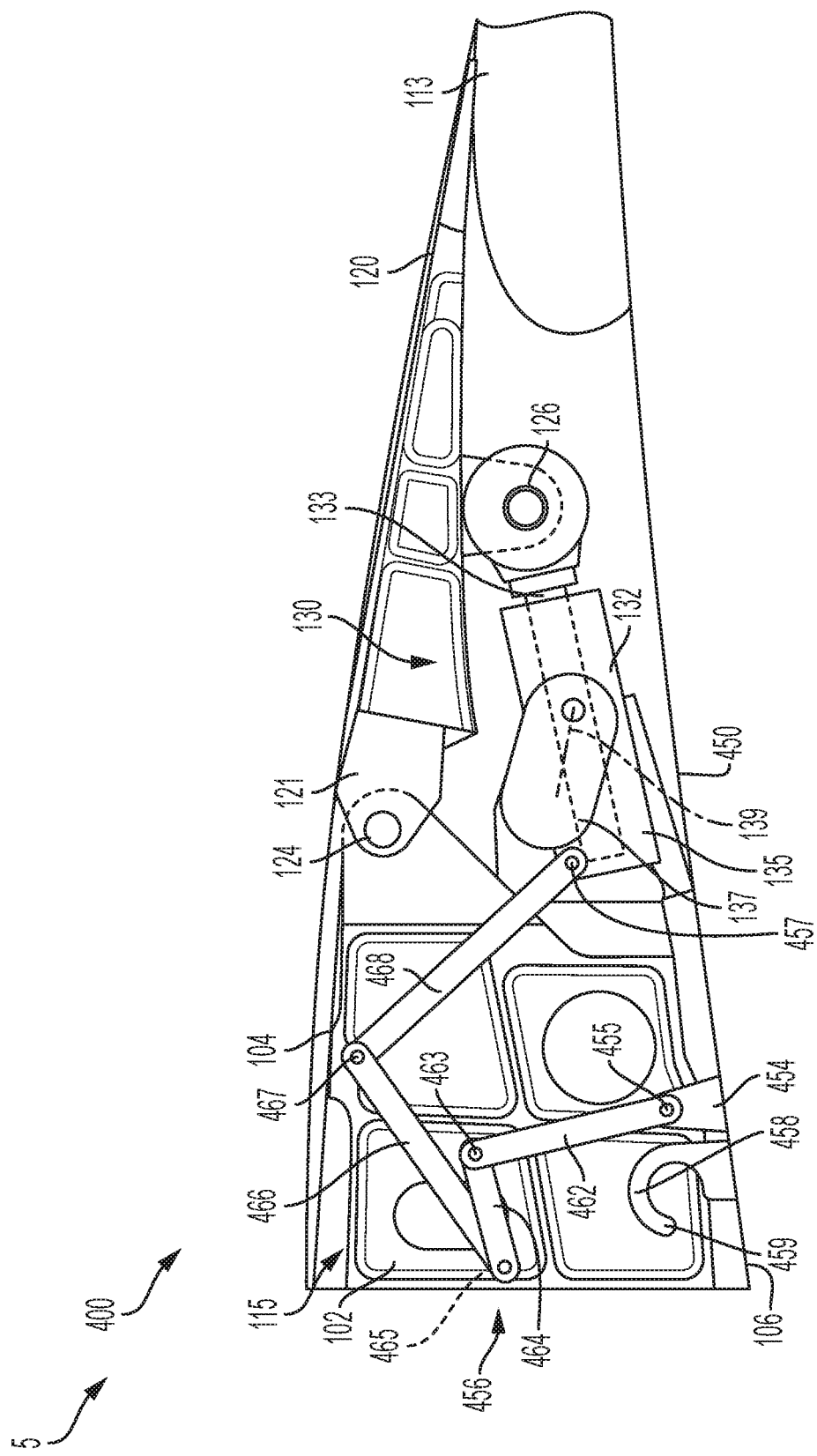
FIG. 4A is a schematic cross-sectional representation of a spoiler actuator loft alleviation mechanism in a first position, according to another embodiment.
Figure 4B:
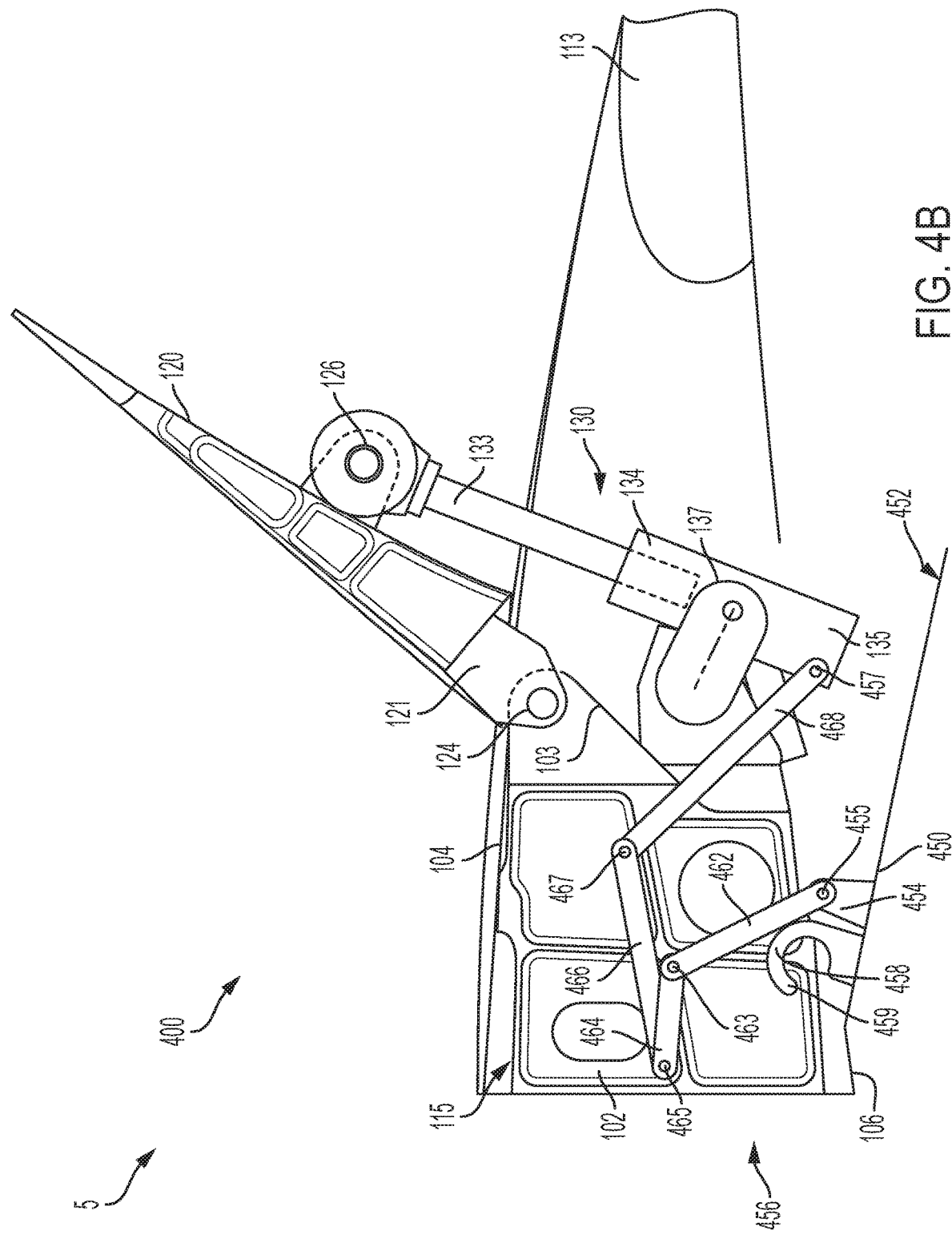
FIG. 4B is a schematic cross-sectional representation of a spoiler actuator loft alleviation mechanism in a second position, according to another embodiment.

FIGS. 4A and 4B illustrate another embodiment of a wing spoiler actuator mechanism 400 for an aircraft wing 5. As discussed with reference to the other illustrated embodiments, the wing structure includes the rib 102 terminating in the aft edge 103. The spoiler 120 is pivotally attached to the rib 102 at the forward hinge end 121 with the first axle 124. The actuator 130 is pivotally coupled to the spoiler 120 such that actuation of the actuator 130 induces rotation of both the spoiler 120 and the actuator 130. The arm 133 of the actuator 130 is pivotally attached to the coupling member 122 of the spoiler 120 with the second axle 126.

In a stowed position, as shown in FIG. 4A, the actuator 130 and the components of the wing spoiler actuator mechanism 400 fit within the cove space 115 of the wing. However, when the actuator 130 rotates about the third axis 139, the second end 135 of the actuator 130 moves to an actuated position, shown in FIG. 4B, resulting in a portion of the actuator 130 protruding below the lower surface 106 of the wing.

To accommodate the movement of the actuator 130, a door 450 is pivotally coupled to the lower surface 106 and rotates downward by a transfer of force from the actuator 130 via a multi-link linkage system 456. A first link member 462 is pivotally coupled with the door 450 via a bracket 454 at a first pivot or hinge pin 455. In various embodiments, a second link member 464 is pivotally coupled with the first link member 462 at a second pivot or hinge pin 463 and with the rib 102 at a third pivot or hinge pin 465. A third link member 466 is pivotally coupled with the second link member 464 at the third pivot or hinge pin 465 and to a fourth link member 468 at a fourth pivot or hinge pin 467. The second link member 464 and the third link member 466 comprise a bell crank. In various embodiments, the hinge pin 465 permits a pivotal coupling between the second and third link members 464, 466 and other structural members of the wing 5 other than the rib 102, such as, for example and without limitation, a structural spar or other structural member capable of handling the applied load. In various embodiments, the wing 5 includes a plurality of ribs 102 and the hinge pin 465 pivotally couples the second and third link members 464, 466 to one of the plurality of ribs 102 and the first axle 124 couples the spoiler 120 to another of the plurality of ribs 102.

The fourth link member 468 is pivotally coupled to the second end 135 of the actuator 130 at a fifth pivot or hinge pin 457. The third pivot or hinge pin 465 is fixedly coupled to the wing structure, such as the rib 102, and defines a fixed axis of rotation such that rotation of the actuator 130 causes rotation of the second and third link members 464, 466 about the third pivot or hinge pin 465 and inducing downward rotation of the door 450 from the closed position, shown in FIG. 4A, to the open position, shown in FIG. 4B. The third pivot or hinge pin 465 defines a fixed axis that is forward of the axes defined by the pinned connection between the spoiler 120 and the rib 102 and the pinned connection between the door 450 and the lower surface 106 of the wing 5. The arrangement of link members and hinge pin connections enables applied forces, such as air flow along the lower surface 106 of the wing 5, to be distributed to a variety of structural members of the wing 5, such as one or more ribs 102, rather than the actuator 130 and the door 450.

The bracket 454 is fixedly connected to, or formed integrally with, the door 450. A hinge member 458 includes a sixth pivot or hinge pin 459 to pivotally connect the door 450 with the wing structure, such as the rib 102.

Extension of the arm 133 from the first end 134 of the actuator 130 rotates the spoiler 120 to a deployed position and rotates the actuator 130 such that the second end 135 of the actuator 130 induces, via the multi-link linkage system 456, downward rotation of the door 450 from a closed position, as shown in FIG. 4A, to an open position, as shown in FIG. 4B. In the illustrated embodiment, the second end 135 of the actuator 130 does not directly engage with an interior surface 452 of the door 450. The multi-link linkage system 456 connecting the bracket 454 and the actuator 130 transfers the force to rotate the door 450 between the closed position and the open position without direct contact or scrubbing between the actuator 130 and the door 450. Additionally, the second and third link members 464, 466 act as a bell crank to reduce load transferred to the actuator 130 when the door 450 is in the open position. When in the open position, the second and third link members 464, 466 are positioned near or at top dead center and air pressure acting on the door 450 is greatly reduced from acting on the actuator 130.

Similar to the embodiment discussed with reference to FIGS. 2A and 2B, airflow across the wing travels from left or fore to right or aft and is directed by the door 450 away from the second end 135 of the actuator 130. The increased drag on the wing when the door 450 is in the open position is limited in duration, as compared to a permanent fairing. When the spoiler 120 is not deployed, as shown in FIG. 4A, the door 450 extends substantially in line with the lower surface 106 of the wing structure to minimize aerodynamic effects of drag.

Figure 5A:
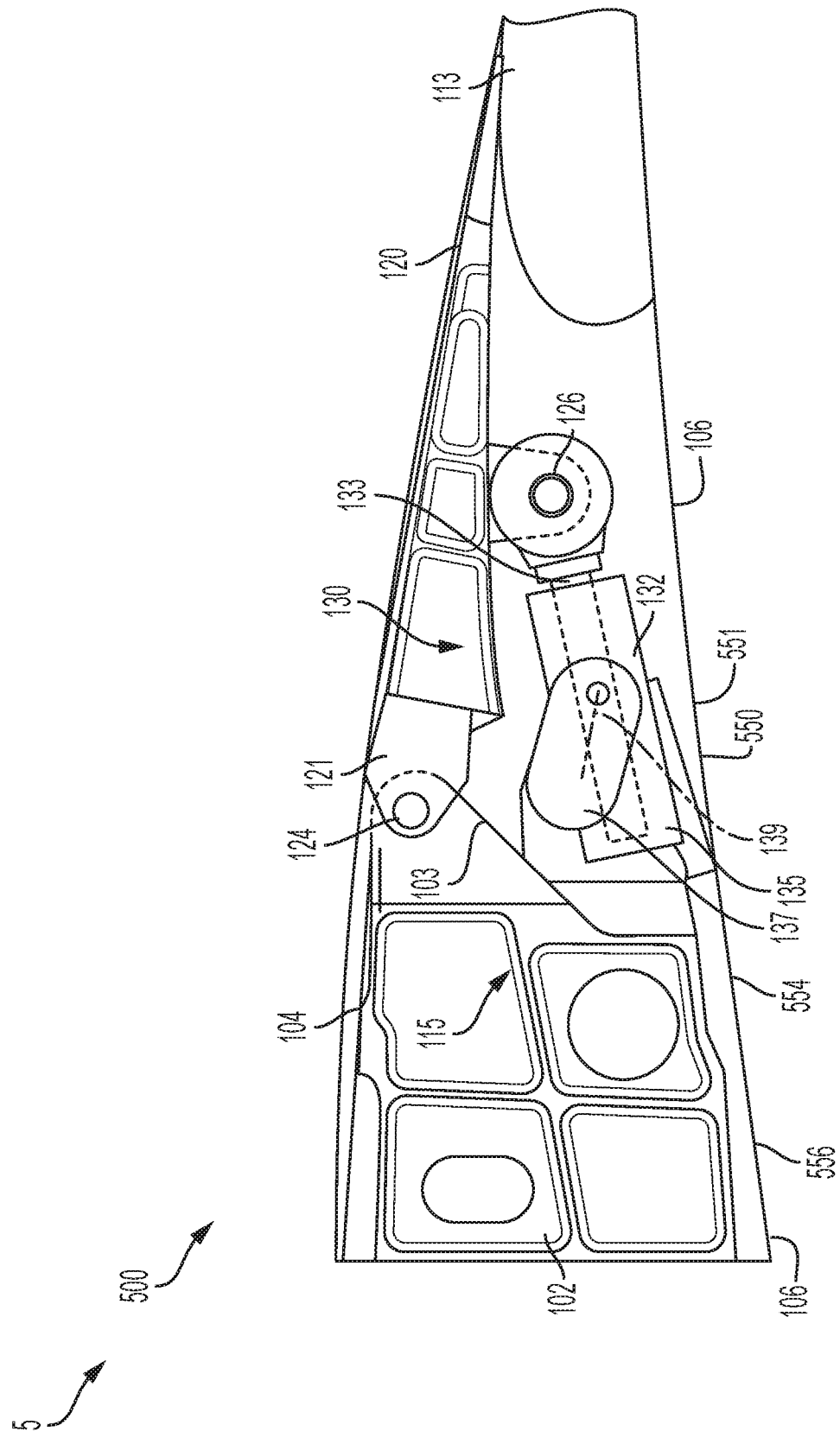
FIG. 5A is a schematic cross-sectional representation of a spoiler actuator loft alleviation mechanism in a first position, according to another embodiment.
Figure 5B:
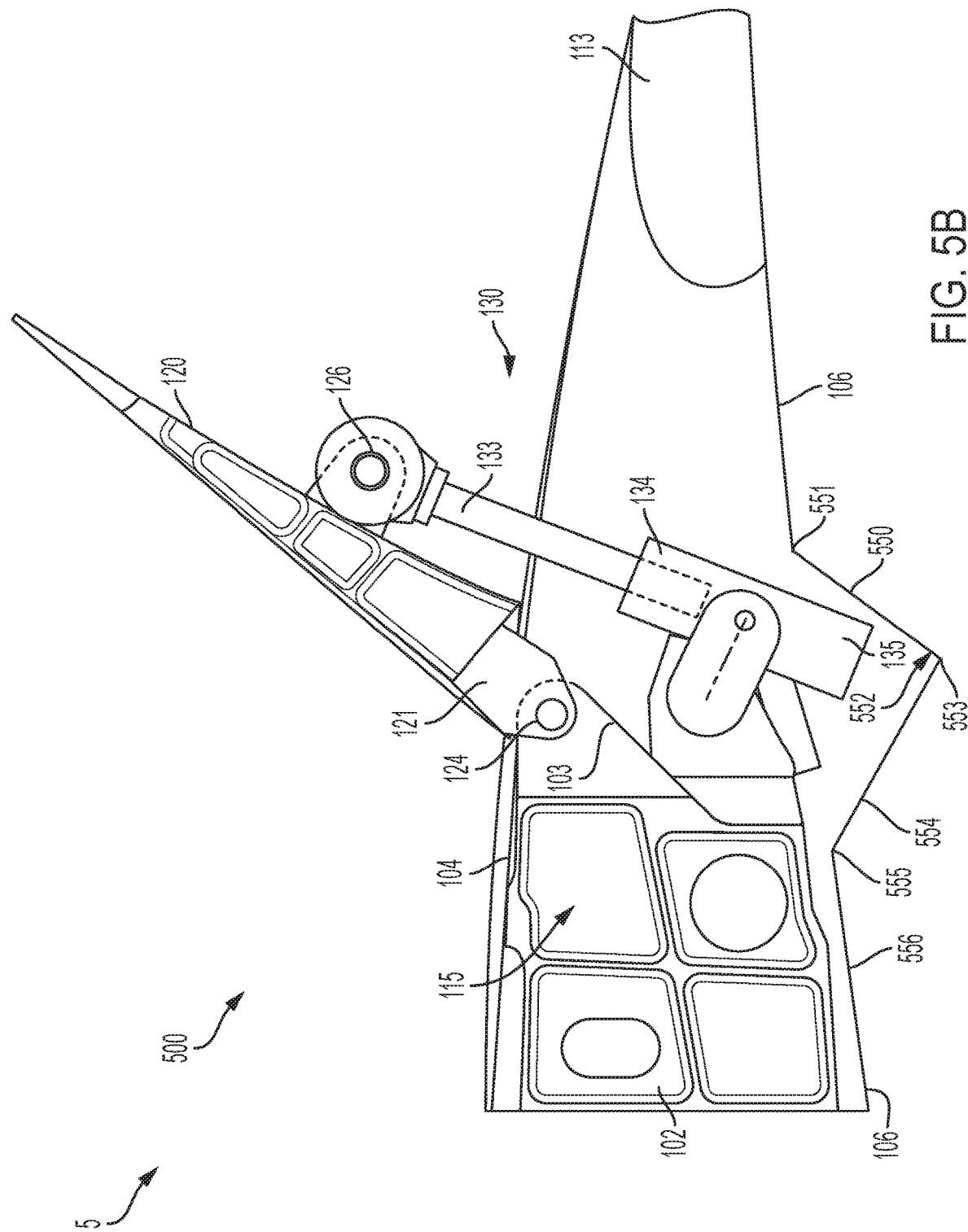
FIG. 5B is a schematic cross-sectional representation of a spoiler actuator loft alleviation mechanism in a second position, according to another embodiment.

Another embodiment of a wing spoiler actuator mechanism 500 for an aircraft wing 5 is illustrated in FIGS. 5A and 5B. As discussed with reference to the other illustrated embodiments, the wing structure includes the rib 102 terminating in the aft edge 103. The spoiler 120 is pivotally attached to the rib 102 at the forward hinge end 121 with the first axle 124. The actuator 130 is pivotally coupled to the spoiler 120 such that actuation of the actuator 130 induces rotation of both the spoiler 120 and the actuator 130. The arm 133 of the actuator 130 is pivotally attached to the coupling member 122 of the spoiler 120 with the second axle 126.

In a stowed position, as shown in FIG. 5A, the actuator 130 fits within the cove space 115 of the wing. However, when the actuator 130 rotates about the third axis 139, the second end 135 of the actuator 130 moves to an actuated position, shown in FIG. 5B, resulting in a portion of the actuator 130 protruding several inches below the lower surface 106 of the wing.

To accommodate the movement of the actuator 130, a bifold door including a first panel 550, a second panel 554, and a third panel 556, is translationally and pivotally coupled to the lower surface 106. Extension of the arm 133 from the first end 134 of the actuator 130 rotates the spoiler 120 to a deployed position, as shown in FIG. 5B and rotates the actuator 130 such that the second end 135 of the actuator 130 induces downward rotation of the first and second panels 550, 554 from a closed position, as shown in FIG. 5A, to an open position, as shown in FIG. 5B. In various embodiments, including the illustrated embodiment, the second end 135 of the actuator 130 directly engages with an interior surface 552 of the first panel 550 of the bifold door to form a temporary blister or fairing to protect the actuator 130 during spoiler deployment.

As shown in FIG. 5B, the first panel 550 is pivotally coupled to the lower surface 106 of the wing structure at a first pivot or hinge pin 551. The second panel 554 is pivotally coupled to the first panel 550 at a second pivot or hinge pin 553 and to the third panel 556 at a third pivot or hinge pin 555. The third panel 556 is translationally coupled to the lower surface 106 of the wing structure. The second and third panels 554, 556 translate fore and aft relative to the wing structure when the actuator 130 rotates from the closed position to the open position. As the second end 135 of the actuator 130 engages with the interior surface 552 of the first panel 550, the first panel 550 rotates in a first, or counter-clockwise direction and the second panel 554 rotates in a second, or clockwise direction due to the connection between the first and second panels 550, 554 at the second pivot or hinge pin 553. As the actuator 130 engages with the first panel 550, the connections between the first, second, and third panels 550, 554, 556 cause the first and second panels 550, 554 to rotate in opposite directions and the second and third panels 554, 556 to translate, to form the temporary blister or area beneath the wing structure to accommodate the second end 135 of the actuator 130. When the spoiler 120 returns to an undeployed position due to retraction of the arm 133 by the actuator 130, the second end 135 of the actuator 130 rotates back within the cove space 115 of the wing, releasing the engagement on the first panel 550 and allowing the first panel 550 to rotate and the second and third panels 554, 556 to translate and return to the closed position shown in FIG. 5A.

The increased drag on the wing when the bifold door is in the open position is limited in duration, as compared to a permanent fairing. When the spoiler 120 is not deployed, as shown in FIG. 5A, the first, second, and third panels 550, 554, 556 extend substantially in line with the lower surface 106 of the wing structure to minimize aerodynamic effects of drag. In various embodiments, the bifold door includes a retention member, such as a spring, that is coupled to the first panel 550 or the third panel 556 and to the wing structure such that the bifold door is predisposed to the closed position.

FIGS. 6A and 6B illustrate another embodiment of a wing actuator spoiler mechanism 600 for an aircraft wing 5. As discussed with reference to the other illustrated embodiments, the wing structure includes the rib 102 terminating in the aft edge 103. The spoiler 120 is pivotally attached to the rib 102 at the forward hinge end 121 with the first axle 124. The actuator 130 is pivotally coupled to the spoiler 120 such that actuation of the actuator 130 induces rotation of both the spoiler 120 and the actuator 130. The arm 133 of the actuator 130 is pivotally attached to the coupling member 122 of the spoiler 120 with the second axle 126.

In a stowed position, as shown in FIG. 6A, the actuator 130 fits within the cove space 115 of the wing. However, when the actuator 130 rotates about the third axis 139, the second end 135 of the actuator 130 moves to an actuated position, shown in FIG. 6B, resulting in a portion of the actuator 130 protruding several inches below the lower surface 106 of the wing 5.

To accommodate the movement of the actuator 130, a fairing 650 is attached to the lower surface 106. The fairing 650 defines a fixed fairing space 652 within which the actuator 130 can rotate to protect the actuator 130 from the environment. The fairing 650 includes a forward panel 654 and an aft panel 656, each of which are substantially aligned with the lower surface 106 of the wing structure. The fairing 650 translates from a first position, shown in FIG. 6A, to a second position, shown in FIG. 6B, as the actuator 130 rotates the spoiler 120 to the deployed position. The second position of the fairing 650 is aft of the first position. In various embodiments, the translation of the fairing 650 is caused by a mechanical connection between the actuator 130 and the fairing 650, or by receipt of an electrical signal from one or more controllers associated with the wing spoiler actuator mechanism 600. Unlike the fairing 150 illustrated in FIG. 1, the fairing 650 is smaller and moveable between the first and second positions based on loft alleviation requirements due to motion of the actuator 130.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A wing spoiler actuator mechanism, comprising:
   an upper spoiler having a free end and a hinge end pivotally coupled to a wing structure at a first fixed axis;
   a door pivotally coupled to the wing structure at a second axis; and
   an actuator pivotally mounted to the wing structure between the upper spoiler and the door, the actuator having an extendable first end and a second end opposite the first end, the extendable first end coupled to the upper spoiler;
   wherein extension of the first end of the actuator rotates the upper spoiler to a deployed position and rotates the actuator such that the second end of the actuator induces downward rotation of the door from a closed position to an open position and the second end of the actuator extends below the wing structure during spoiler deployment.

2. The wing spoiler actuator mechanism of claim 1, wherein the second axis is fixed and the second end of the actuator engages the door to rotate the door from the closed position to the open position.

3. The wing spoiler actuator mechanism of claim 2 further comprising a retention member coupled to the door and the wing structure such that the door is predisposed to the closed position.

4. The wing spoiler actuator mechanism of claim 1 further comprising a coupler linkage disposed between and pivotally coupled to the door and the second end of the actuator, wherein extension of the first end of the actuator rotates the actuator and causes rotation of the coupler linkage inducing downward rotation of the door from the closed position to the open position.

5. The wing spoiler actuator mechanism of claim 4, wherein the coupler linkage comprises:
   a bracket extending from the door;
   a coupler pivotally connected to the bracket and the second end of the actuator;
   a first pivot pin pivotally connecting the coupler to the bracket;
   a second pivot pin pivotally connecting the coupler to the actuator; and
   a third pivot pin pivotally connecting the door to the wing structure;
   wherein rotation of the actuator causes rotation of the coupler about the first pivot pin inducing downward rotation of the door from the closed position to the open position.

6. The wing spoiler actuator mechanism of claim 4, wherein the coupler linkage comprises:

a bracket extending from the door; and
a first link member, a second link member, a third link member, and a fourth link member, the first link member pivotally connected to the bracket and to the second link member; the second link member pivotally connected to the first link member and to the wing structure at a third fixed axis, the third link member pivotally coupled to the wing structure at the third fixed axis and to the fourth link member, and the fourth link member pivotally coupled to the third link member and the actuator;
wherein rotation of the actuator causes rotation of the second and third link members about the third fixed axis inducing downward rotation of the door from the closed position to the open position.

7. The wing spoiler actuator mechanism of claim 6, wherein the third fixed axis is forward of the first and second axes.

8. The wing spoiler actuator mechanism of claim 1, wherein the door includes a first panel, a second panel, and a third panel, the first panel is pivotally coupled to the wing structure at the second axis, the second panel is pivotally coupled to the first panel and to the third panel, and the third panel is translationally coupled to the wing structure such that the second end of the actuator engages the door to rotate the first panel in a first direction and the second panel in a second direction opposite the first direction to move the door from the closed position to the open position.

9. The wing spoiler actuator mechanism of claim 8, wherein each of the second and third panels translates relative to the wing structure as the door moves between the closed position and the open position.

10. An aircraft wing, comprising:
an upper wing structure and a lower wing structure joined by a spar;
a rib coupled to the spar;
an upper spoiler having a first end and a hinge end pivotally coupled to the rib at a first fixed axis;
a door coupled to the lower wing structure and movable between a closed position and an open position; and
an actuator pivotally mounted within the aircraft wing between the upper spoiler and the door, the actuator having an extendable first end coupled to the upper spoiler and an opposite second end;
wherein extension of the first end of the actuator rotates the upper spoiler to a deployed position and rotates the actuator such that the second end of the actuator induces downward movement of the door from the closed position to the open position in which the second end of the actuator extends below the lower wing structure during spoiler deployment.

11. The aircraft wing of claim 10, wherein the door is pivotally coupled to the lower wing structure at a second axis and the second end of the actuator engages the door to rotate the door from the closed position to the open position.

12. The aircraft wing of claim 10 further comprising a coupler linkage disposed between and pivotally coupled to the door and the second end of the actuator, wherein extension of the first end of the actuator rotates the actuator and causes rotation of the coupler linkage inducing downward rotation of the door from the closed position to the open position.

13. The aircraft wing of claim 12, wherein the coupler linkage comprises:
a bracket extending from the door;
a coupler pivotally connected to the bracket and the second end of the actuator;
a first pivot pin pivotally connecting the coupler to the bracket;
a second pivot pin pivotally connecting the coupler to the actuator; and
a third pivot pin pivotally connecting the door to the lower wing structure;
wherein rotation of the actuator causes rotation of the coupler about the first pivot pin inducing downward rotation of the door from the closed position to the open position.

14. The aircraft wing of claim 12, wherein the coupler linkage comprises:
a bracket extending from the door; and
a first link member, a second link member, a third link member, and a fourth link member, the first link member pivotally connected to the bracket and to the second link member; the second link member pivotally connected to the first link member and to the spar at a third fixed axis, the third link member pivotally coupled to the spar at the third fixed axis and to the fourth link member, and the fourth link member pivotally coupled to the third link member and the actuator;
wherein rotation of the actuator causes rotation of the second and third link members about the third fixed axis inducing downward rotation of the door from the closed position to the open position.

15. The aircraft wing of claim 14, wherein the third fixed axis is forward of the first fixed axis.

16. The aircraft wing of claim 10, wherein the door includes a first panel and a second panel, the first panel is pivotally coupled to the lower wing structure and the second panel is pivotally coupled to the first panel and to the lower wing structure such that the second end of the actuator engages the door to rotate the first panel in a first direction and the second panel in a second direction opposite the first direction to move the door from the closed position to the open position.

17. The aircraft wing of claim 16, wherein each of the first and second panels translates relative to the lower wing structure as the door moves between the closed position and the open position.

18. A wing spoiler actuator mechanism, comprising:
an upper spoiler having a free end and a hinge end pivotally coupled to a wing structure at a first fixed axis;
a fairing movably coupled to the wing structure; and
an actuator pivotally mounted to the wing structure between the upper spoiler and a door, the actuator having an extendable first end coupled to the upper spoiler and an opposite second end;
wherein extension of the first end of the actuator rotates the upper spoiler to a deployed position and rotates the actuator such that the second end of the actuator induces translation of the fairing from a first position to a second position and the second end of the actuator extends outside the wing structure during spoiler deployment.

19. The wing spoiler actuator mechanism of claim 18, wherein the fairing defines a fairing space configured to receive the second end of the actuator and the first position of the fairing is forward of the second position.

20. The wing spoiler actuator mechanism of claim 18, wherein the fairing includes a first panel and a second panel, the first panel is pivotally coupled to the wing structure and the second panel is pivotally coupled to the first panel and to the wing structure such that the second end of the actuator engages the fairing to rotate the first panel in a first direction and the second panel in a second direction opposite the first direction to move the door from a closed position to an open position.

\* \* \* \* \*